United States Patent
Hardouin et al.

(10) Patent No.: US 9,906,321 B2
(45) Date of Patent: Feb. 27, 2018

(54) METHOD OF SIGNALLING INTENDED TO BE IMPLEMENTED BY A CELLULAR TELECOMMUNICATION NETWORK, BASE STATION AND TERMINAL CORRESPONDING THERETO

(71) Applicant: Orange, Paris (FR)

(72) Inventors: Eric Hardouin, Paris (FR); Daniel Jaramillo Remirez, Paris (FR); Marios Kountouris, Paris (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/911,998

(22) PCT Filed: Aug. 1, 2014

(86) PCT No.: PCT/FR2014/052014
§ 371 (c)(1),
(2) Date: Feb. 12, 2016

(87) PCT Pub. No.: WO2015/022461
PCT Pub. Date: Feb. 19, 2015

(65) Prior Publication Data
US 2016/0197694 A1    Jul. 7, 2016

(30) Foreign Application Priority Data

Aug. 12, 2013    (FR) ...................... 13 57957

(51) Int. Cl.
*H04J 3/14* (2006.01)
*H04J 11/00* (2006.01)
*H04L 5/00* (2006.01)

(52) U.S. Cl.
CPC ....... *H04J 11/0026* (2013.01); *H04J 11/0053* (2013.01); *H04L 5/0035* (2013.01)

(58) Field of Classification Search
CPC ...................................................... H04B 15/00
See application file for complete search history.

(56) References Cited

U.S. PATENT DOCUMENTS

| 9,319,152 B2 * | 4/2016 | Narayan ................ H04B 15/00 |
| 2008/0153440 A1 * | 6/2008 | Rhee .................... H04B 7/0848 455/137 |

(Continued)

FOREIGN PATENT DOCUMENTS

| EP | 1895680 A2 | 3/2008 |
| FR | 1352453 A | 2/1964 |

OTHER PUBLICATIONS

English translation of the International Written Opinion dated Feb. 16, 2016 for corresponding International Application No. PCT/FR2014/052014, filed Aug. 1, 2014.

(Continued)

*Primary Examiner* — Shukri Taha
(74) *Attorney, Agent, or Firm* — David D. Brush; Westman, Champlin & Koehler, P.A.

(57) ABSTRACT

A method is implemented by a cellular telecommunications network. The method includes: returning indicators from first and second terminals to the network, including, for the respective terminal, an indicator of a maximum reception rate without interference canceling in the presence of an interfering signal, and, for the first terminal, both an indicator of the maximum reception rate with interference canceling in the presence of the interfering signal, and an indicator of the maximum reception rate of the interfering signal; the network determining whether to activate interference canceling by the first terminal and determining respective data rates to be allocated to the first and second terminals as a function of the returned indicators; the network notifying the first terminal whether to activate interference canceling and modifying the first and second termi- (Continued)

nals of the allocated data rates; the network signaling to the first terminal the data rate allocated to the second terminal.

9 Claims, 1 Drawing Sheet

(56) References Cited

U.S. PATENT DOCUMENTS

| | | | | |
|---|---|---|---|---|
| 2009/0290516 | A1* | 11/2009 | Han | H03G 3/3068 370/277 |
| 2011/0069742 | A1* | 3/2011 | Narayan | H04B 1/7107 375/148 |
| 2013/0196701 | A1* | 8/2013 | Tiirola | H04J 11/0026 455/501 |
| 2016/0080029 | A1* | 3/2016 | Hua | H04B 7/0417 375/144 |

OTHER PUBLICATIONS

Motorola, R1-081638 "TBS and MCS signaling and tables", 3GPP TSG RAN1 #52bis, Mar. 31-Apr. 4, 2008.
3GPP TS 36.213 V11.3.0 (Jun. 2013), 3rd Generation Partnership Project; "Technical Specification Group Radio Access Network; Evolved Universal Terrestrial Radio Access (E-UTRA); Physical layer procedures (Release 11)".
International Search Report and Written Opinion dated Oct. 20, 2014 for corresponding International Application No. PCT/FR2014/052014, filed Aug. 1, 2014.
Orange: "Views on Netrowk-Assisted Interference Cancellation and Suppression", 3GPP Draft; R1-131633, 3rd Generation Partnership Project (3GPP) Mobile Competence Centre; 650, Route Des Lucioles; F-06921 Sophia-Antipolis Cedex; France, vol. RAN WG1, No. Chicago, USA; Apr. 15, 2013-Apr. 19, 2013, Apr. 9, 2013 (Apr. 9, 2013), XP050697418.
Samsung: "Discussion on Support for MU-CSI" 3GPP Draft; R1-133088 Discussion on MU-CSI Final, 3rd Generation Partnership Project (3GPP), Mobile Competence Centre; 650, Route Des Lucioles; F-06921 Sophia-Antipolis cedex; France, vol. RAN WG1, No. Barcelona, Spain; Aug. 19, 2013-Aug. 23, 2013, Aug. 10, 2013 (Aug. 10, 2013), XP050716308.
French Search Report and Written Opinion dated Apr. 7, 2014 for corresponding French Application No. 1357957, filed Aug. 12, 2013.
Bruno Clerckx, Heunchul Lee, Young-Jun Hong, and Gil Kim, "Rank Recommendation-based Coordinated Scheduling for Interference Mitigation in Cellular Networks" in Proc. IEEE Global Telecom. Conference (GLOBECOM'11), Dec. 2011.
TR 36.819 entitled "Coordinated multipoint operation for LTE physical layer aspects", Release 11, as published by the 3GPP.

* cited by examiner

METHOD OF SIGNALLING INTENDED TO BE IMPLEMENTED BY A CELLULAR TELECOMMUNICATION NETWORK, BASE STATION AND TERMINAL CORRESPONDING THERETO

CROSS-REFERENCE TO RELATED APPLICATIONS

This Application is a Section 371 National Stage Application of International Application No. PCT/FR2014/052014, filed Aug. 1, 2014, which is incorporated by reference in its entirety and published as WO 2015/022461 A1 on Feb. 19, 2015, not in English.

FIELD OF THE INVENTION

The present invention relates to the field of telecommunications. Within this field, the invention relates more particularly to so-called "digital" communications. Digital communications include in particular wireless communications. The communication transmission medium is commonly referred to as a transmission channel or a propagation channel, by analogy with a channel over the air.

The invention relates more particularly to signaling terminal configuration parameters to a terminal in order to enable the terminal to communicate with a cellular telecommunications network.

The invention thus has a preferred, but non-limiting, application in the context of long-term evolution (LTE) mobile cellular telecommunications networks as defined by the Third Generation Partnership Project (3GPP), and in particular for the down link, i.e. for communication going from a base station (or eNodeB) to mobile terminals (also known as user equipment (UE)).

PRIOR ART

The capacity of mobile cellular telecommunications networks, and in particular the capacity of LTE networks determines the total quantity of data that a system can stream for its various users, with this quantity also being known as the sum-rate (SR).

In known manner, the capacity of a mobile telecommunications network, and in particular of an LTE network, is limited by interference. Such interference may be of various kinds. Among the kinds of interference that are the most damaging in terms of the capacity of a cellular network, mention may be made in particular of:

single user-multiple input multiple output (SU-MIMO) interference associated with using multiple antennas on transmission and on reception, and which corresponds to the interference generated between the MIMO data streams allocated to a given terminal;

multiple user-multiple input multiple output (MU-MIMO) interference, which corresponds to the interference generated between MIMO data streams allocated to different terminals; and intercellular interference, generated between the signals transmitted by different cells to different terminals, but reusing the same time-frequency resources.

The invention lies in the context of reducing intercellular interference and/or MU-MIMO interference as evaluated at network level for the particular purpose of achieving performance that is better in terms of data rate for users who might be at a cell edge.

Intercellular interference can be reduced by using techniques for co-operation between cells, commonly referred to as coordinated multipoint (CoMP) techniques.

For an LTE network, such techniques are described in greater detail in the document TR 36.819 entitled "Coordinated multipoint operation for LTE physical layer aspects", Release 11, as published by the 3GPP.

Some of those techniques seek to coordinate the allocation of resources and the precoding that is performed by the base stations controlling cells neighboring a given cell, so as to minimize the interference created in that cell by its neighboring cells.

Thus, [1] describes how a terminal can make recommendations to the network to enable it to determine a joint allocation of transmission parameters for cells neighboring its own server cell so as to maximize the performance of the network. Maximization is performed by reducing the number of streams transmitted by interferers. The simplicity of that technique is accompanied by sub-optimal use of the radio spectrum, which is not satisfactory given the fact that the terminals are basic receivers, i.e. conventional or advanced linear receivers that do not include interference canceling means; such receivers therefore handle interference as noise and they are referred to below in this document as interference as noise (IaN) receivers. Such receivers are used so as to maximize the capacity of a point-to-point link, i.e. a single link.

Non-linear receivers, such as for example minimum mean square error-successive interference cancellation (MMSE-SIC) receivers use interference canceling techniques that give such receivers performance that is much better than the performance of IaN linear receivers, in particular in order to maximize the sum-rate of the network in the context of multi-link channels, i.e. channels having a plurality of sources and/or a plurality of receivers.

For multi-link channels in the presence of interference-canceling receivers, maximizing the data rate of each link independently of the other links does not necessarily lead to the total rate of the network being maximized. Maximizing the rate of one link independently of the other links can make interference canceling impossible, which can lead to a major loss in the sum-rate (total rate) of the network, as explained below.

The principle of the reception system in an MMSE-SIC receiver is shown in FIG. 1.

In the illustration, the MMSE-SIC receiver comprises, in conventional manner, a radio frequency module RF, a (frequency and time) synchronizer module SYNCHRO F-T, a multicarrier demodulator module $OFDM^{-1}$, a channel estimator and radio measurement module ESTIM, an equalizer and multi-antenna processor module MIMO, a demodulator module DEMOD, a combiner module HARQ for combining blocks of code bits, and a channel decoder module DECOD.

The equalizer and processor module MIMO may be represented diagrammatically in the form of a linear processor module, e.g. of the MMSE or IRC type, together with a parallel-connected SIC module, with only one of these two modules being activated at any one time. Below in this document, when interference canceling is not activated, the receiver is said to be an MMSE receiver, and when interference canceling is activated, the receiver is said to be an SIC receiver. These modules enable the following processing to be performed in a spatial multiplexing context, which consists in transmitting a plurality of streams or spatial layers over the same time-frequency resources (referred to as physical resource blocks (PRBs) in an LTE network).

If SIC processing is not activated, the output signal from the multicarrier demodulator module is subjected to MMSE type processing, which serves to estimate the data stream coming from the server cell while reducing interference by considering it to be noise, possibly colored noise.

If SIC processing is activated, on a first pass, the output signal from the multicarrier demodulator module is subjected to MMSE-SIC type processing that serves to estimate the signal of the first spatial layer and then to subtract it from the output signal of the multicarrier demodulator module. If the estimate is error-free, then the resulting signal has been "cleaned" of the interference created by the first spatial layer.

The resulting signal is then subjected to MMSE processing, which serves to estimate the signal corresponding to the second spatial layer. The process may continue by subtracting the signal corresponding to the second spatial layer from the preceding result signal in order to estimate a third layer, and so on. This successive canceling of interference from each layer is referred to as SIC processing.

More precisely, and for reasons of simplification by considering the situation of only two layers, which corresponds to a single interferer and to single-layer (i.e. non-SU-MIMO) transmission from the serving cell and the interfering cell, MMSE-SIC processing makes it possible to estimate the interfering signal (corresponding to interference of MU-MIMO or intercellular type), e.g. by performing a step of (channel) decoding the signal from the corresponding interferer. The received interfering signal is then reconstructed on the basis of the estimate of the data of the interfering stream, of the estimate of the interfering channel, and of knowledge of the transmission parameters allocated to the interferer. The reconstructed interfering signal is then subtracted from the signal received by the terminal. The signal as obtained in this way, which has been cleaned of the interference if the interference has been estimated perfectly, is then used for detecting the payload signal that is for the terminal.

More generally, once the second layer has been decoded correctly, the corresponding reconstructed signal can be subtracted from the signal in order to demodulate a third layer using the same method as described for the second layer. And so on for other layers.

Two variants of an MMSE-SIC receiver can be distinguished: a "hard SIC" receiver and a "turbo SIC" receiver.

In a hard SIC receiver, the signal from each interferer is estimated and subtracted from the received signal on one occasion only.

In order to ensure that the estimated interference is error-free, it is therefore necessary for the channel decoding to be successfully. This success can be verified by the receiver making use of a cyclic redundancy check (CRC).

With turbo SIC, the process of estimating interfering signals and the payload signal is iterative. In the first iteration, the above-described process is performed, using so-called soft channel decoding. The estimated data (for an interfering signal and for the payload signal) at the output from decoding is then not error-free, but rather probabilistic, with the value of each soft data item representing the reliability with which it has been estimated. The estimate of a signal on each pass is therefore not perfect, such that only some of the interference is eliminated from the received signal before detecting the following layer. On the second iteration, the signal from each layer is once more estimated using soft decoding, on the basis of a received signal from which the interference estimated for the preceding layer has been subtracted. This second estimate of each layer is thus refined relative to the estimate made at the preceding iteration. A plurality of iterations can be performed, until the payload signal is decoded correctly.

In the context of the invention, an SIC terminal comprises a receiver having parameters that can be set to perform reception processing that is conventional or reception processing with interference canceling.

Although the present version (Release 11) of the LTE advanced standard does not specify the mechanisms enabling the receiver to know all of the transmission parameters allocated to the interferer, which is necessary in order to enable its signal to be decoded, mechanisms do exist in the prior art that enable the receiver to know these parameters.

Nevertheless, it remains very difficult to perform link adaptation at network level for the purpose of taking advantage of interference canceling receivers in order to reduce the effect of intercellular interference on the performance of the network.

It should be recalled that link adaptation is the procedure that determines the way in which data is to be encoded for transmission to a selected terminal that is to be served. It consists in deciding on a modulation and coding scheme (MCS). The MCS determines the spectrum efficiency of transmission to the terminal, and thus its data rate (which is given by the spectrum efficiency multiplied by the transmission bandwidth, which itself is determined by the number of PRBs determined by resource allocation). Thus, the way the link is adapted determines the data rate of the terminal. Link adaptation is performed by the entity responsible for allocating resources, known as a scheduler.

In order to enable the network to adapt a link, each terminal returns to the network an indicator of the maximum MCS that it is capable of receiving, i.e. the maximum spectrum efficiency and the maximum data rate in a given bandwidth. This maximum data rate depends on reception conditions at the terminal: i.e. both the power received from its server transmission point and also the level of interference. In the LTE standard, this maximum MCS indicator is known as the channel quality indicator (CQI). It is typically calculated by the terminal using reference signals that are transmitted by its server transmission point. It should be observed that because of the dynamic nature of resource allocation, interferers are not necessarily the same at the time when a terminal calculates a CQI and the time when the network serves that terminal.

If a receiver is suffering from an interferer that is being served by a neighboring cell, then for that receiver to be capable of performing SIC processing efficiently, it is necessary for the MCS of the interference signal to be low enough to enable the receiver to decode it. If by default this is not true, then the neighboring cell must reduce the MCS (and thus the data rate) allocated to the interferer before the receiver suffering interference activates SIC processing in order to enable that receiver to decode the interference signal effectively so as to estimate it. However such a reduction in allocated data rate can have a negative impact on the sum-rate (SR) of the network.

SUMMARY OF THE INVENTION

The invention proposes a signaling method in particular for reducing intercellular or MU-MIMO interference evaluated at network level for the purpose specifically of achieving performance that is better in terms of data rate for users, whenever one user is likely to interfere with another, while also improving a sum-rate of the network.

The signaling method of the invention is for implementing by a cellular telecommunications network comprising a base station that controls at least a first transmission point serving a first terminal having a receiver with activatable interference canceling, the first terminal potentially suffering interference from an "interfering" signal for a second terminal. The signaling method comprises:

a step of returning indicators from the first and second terminals to the network, the indicators comprising, for one terminal, an indicator of the maximum reception rate without interference canceling in the presence of the signal for the other terminal, and further comprising, for the first terminal, both an indicator of the maximum reception rate with interference canceling in the presence of the signal for the second terminal, and an indicator of the maximum reception rate of the signal for the second terminal;

a step of the network determining whether or not to activate interference canceling by the first terminal, and of determining the respective data rates to be allocated to the first and second terminals as a function of the returned indicators;

a step of the network notifying the first terminal whether or not to activate interference canceling and notifying the first and second terminals of the respective allocated data rates; and a step of the network signaling to the first terminal the data rate that has been allocated to the second terminal.

Thus, the network has one or more transmission points serving the various terminals. Both terminals may be served simultaneously by a single transmission point controlled by the same base station having a plurality of antennas. This configuration makes it possible to use multiuser MIMO type transmission. Thus, even if the transmission point is serving two terminals simultaneously using a MU-MIMO technique, the signal for one of the terminals may constitute an interfering signal for the other terminal. The interference is of the MU-MIMO intercellular type.

When the terminals are served by different transmission points, the signal for the second terminal, i.e. the signal transmitted by the transmission point serving it, is seen by the first terminal as an interfering signal. The interference is of the intercellular type.

The first transmission point (and also the second transmission point if it exists) participate(s) in co-operatively allocating the data rate achieved by the network.

The other transmission points are said to be non-co-operating, and both terminals consider the signals that they generate as constituting noise.

If the first terminal is capable of performing interference canceling on reception, e.g. of the SIC type, then the invention distinguishes between the interference due to the signal for the second terminal and the remainder of interference due to the other terminals (i.e. due to the signals for those other terminals). In a first implementation, this remainder of interference is considered to be noise.

The signal for the second terminal that interferes with the reception of the first terminal generally corresponds to an interferer that is dominant from among the various signals interfering with reception by the first terminal.

The indicators enable the network to determine the data rate to be allocated among the transmission points participating in the co-operation.

The indicators selected for returning can make it possible to evaluate the impact on the sum-rate of the network of making use of interference canceling by a receiver. These indicators serve to evaluate the sum-rate in the absence of SIC processing and the sum-rate if SIC processing is activated for the first terminal.

ICIThese data rate indicators correspond to CQIs, whereas the sum-rate is evaluated by determining the MCSs associated with the CQIs and by summing the respective rates obtained with these MCSs for both terminals.

The network determines the configuration for the terminals that procures an improvement in the sum-rate and it notifies the terminals accordingly.

The signaling method thus makes it possible on all occasions to avoid decreasing the sum-rate, by determining whether or not to activate interference canceling processing as a function of the impact such interference canceling has on the data rate indicators. The signaling method serves to maximize performance in terms of improvement in data rate as seen by the network by taking advantage of the potential for interference canceling by SIC terminals. The data rate to be allocated to the second terminal should be the smaller of the data rate it is capable of receiving and of the data rate corresponding to the indicator returned by the first terminal for the maximum reception rate of the signal to the other terminal. Performance can be maximized by preventing a data rate being allocated to the second terminal that is below a certain threshold, e.g. set as a function of its returned indicator of the maximum reception rate without interference canceling.

Co-operation may be extended to more than two cells, and in general manner to N cells.

In an implementation, the indicator of the maximum reception rate of the signal for the second terminal is determined without interference canceling on reception. This type of indicator is obtained more particularly with a receiver of the hard SIC type.

In an implementation, the indicator of the maximum reception rate of the signal for the second terminal is determined with interference canceling on reception. This type of indicator is more particularly suitable for a receiver of turbo SIC type.

In an implementation, the second terminal is served by a second transmission point different from the first transmission point. In this implementation, the returning of indicators to the network comprises:

returning indicators from a terminal to its server transmission point; and a step of indicators being transmitted from the transmission point to the base station.

In this implementation, the base station controlling the server transmission point of the first terminal can determine whether interference canceling needs to be activated and can determine the data rates to be allocated. This implementation is particularly suitable when the base station hosts a scheduler that is common to both transmission points.

In an implementation, the second terminal has a receiver with activatable interference canceling. In this implementation:

the step of returning indicators further comprises the second terminal returning an indicator of the maximum reception rate with interference canceling in the presence of the signal for the first terminal and an indicator of the maximum reception rate of the signal for the first terminal;

the network determines whether to activate interference canceling by one or none of the terminals having a receiver with activatable interference cancellation;

the network notifies the terminals with receivers having activatable interference canceling whether or not to activate interference cancellation; and the network also signals to the second terminal the data rate allocated to the first terminal.

The invention also provides a computer program. According to the invention, the computer program includes instructions for executing steps of the signaling method when said program is executed by a computer.

The invention also provides a computer-readable data medium storing a computer program comprising instructions for executing steps of the signaling method.

The invention also provides a base station of a cellular telecommunications network that controls at least a first transmission point that serves a first terminal with a receiver having activatable interference canceling, the first terminal potentially suffering interference from a signal for a second terminal. According to the invention, the base station comprises:

a module for receiving indicators returned from the first terminal comprising an indicator of the maximum reception rate without canceling of interference due to the second terminal, an indicator of the maximum reception rate with canceling of interference due to the second terminal, and an indicator of the maximum reception rate of the signal for the second terminal;

a module for notifying the first terminal whether or not to activate interference canceling and for notifying the data rate allocated as a function of the various indicators; and a module for signaling to the first terminal the data rate allocated to the second terminal.

The invention also provides a terminal with a receiver having activatable interference canceling and served by a first transmission point of a cellular telecommunications network, the transmission point being controlled by a base station, said terminal potentially suffering interference from an "interfering" signal for a second terminal. According to the invention, the terminal comprises:

a module for returning indicators to the network comprising an indicator of the maximum reception rate without interference canceling, an indicator of the maximum reception rate with interference canceling in the presence of the interfering signal, and an indicator of the maximum reception rate of the interfering signal;

a module for reception processing with interference cancellation that is activatable by a parameter transmitted by the network;

a module for receiving the data rate allocated to the terminal as determined by the network as a function of the return indicators; and a module for receiving signaling from the network about a data rate allocated to the second terminal.

The invention also provides a system of a cellular telecommunications network. According to the invention, the system comprises:

a base station controlling at least a first transmission point of the cellular telecommunications network; and a first terminal with a receiver having activatable interference canceling served by the first transmission point and potentially suffering interference from a signal for a second terminal;

the base station comprising:

a module for receiving indicators returned from the first terminal comprising an indicator of the maximum reception rate without canceling of interference due to the second terminal, an indicator of the maximum reception rate with canceling of interference due to the second terminal, and an indicator of the maximum reception rate of the signal for the second terminal;

a module for notifying the first terminal whether or not to activate interference canceling and for notifying the data rate allocated as a function of the various indicators; and a module for signaling to the first terminal the data rate allocated to the second terminal;

the terminal comprising:

a module for returning indicators to the network comprising an indicator of the maximum reception rate without canceling of interference, an indicator of the maximum reception rate with interference canceling in the presence of the interfering signal, and an indicator of the maximum reception rate of the interfering signal;

a module for reception processing with interference cancellation that is activatable by a parameter transmitted by the network;

a module for receiving the data rate allocated to the terminal as determined by the network as a function of the return indicators; and a module for receiving signaling from the network about a data rate allocated to the second terminal.

BRIEF DESCRIPTION OF THE DRAWING

Other characteristics and advantages of the present invention appear from the following description made with reference to the accompanying drawing, showing implementations that have no limiting character. In the figures.

DETAILED DESCRIPTION OF THE INVENTION

The invention lies in the context of a network having at least one base station, a terminal, and a transmission point that serves the terminal, which terminal might suffer interference from a signal for a second terminal. The second terminal is served by a second access point generating the interfering signal. The second access point is referred to as the "interferer".

Figure 1:
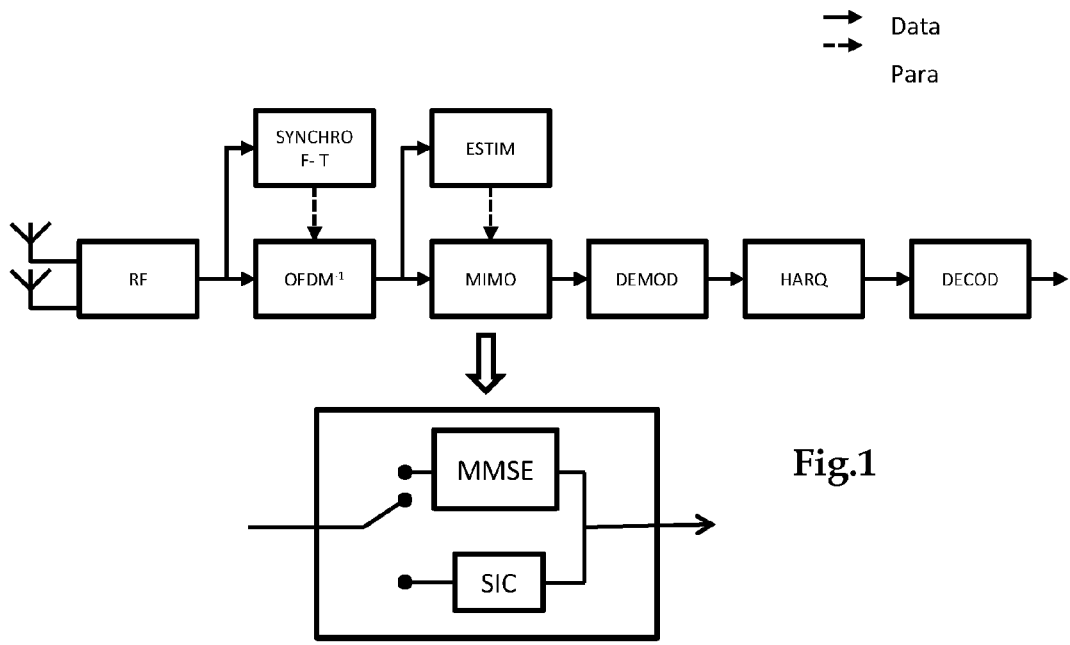
FIG. 1 is a diagram of an activatable MMSE-SIC receiver.
Figure 2:
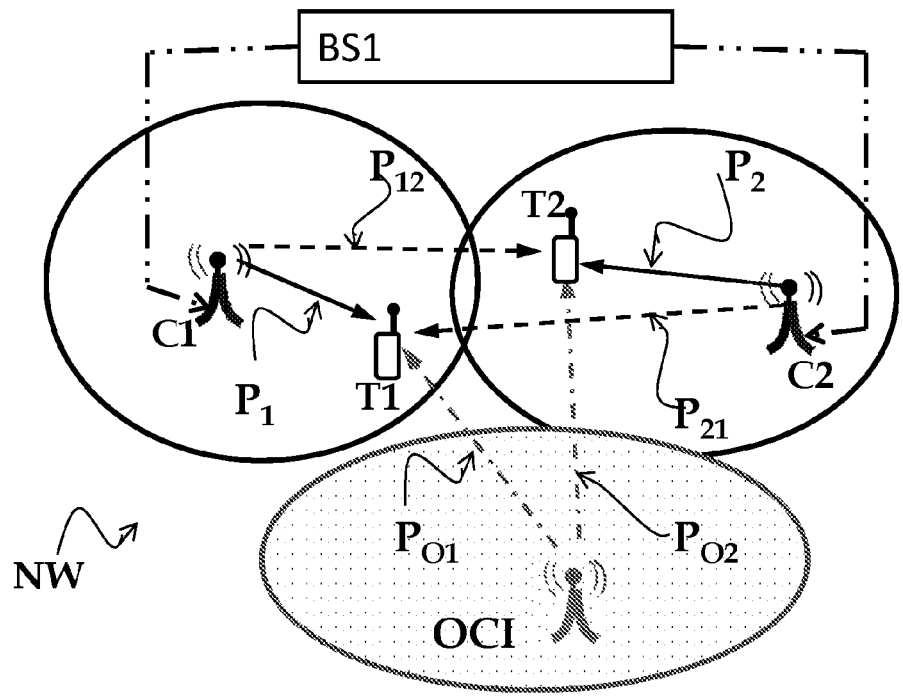
FIG. 2 is a diagram of a telecommunications network having at least one base station and two transmission points respectively serving two terminals.

The following description refers to FIG. 2, which for reasons of clarity in the drawing, shows two distinct transmission points C1, C2 respectively serving two terminals T1, T2. This figure is not limiting and serves solely for the purposes of illustration.

A transmission point designates the entity serving a terminal, where the terms "transmission point" and "transmitter" are equivalent. A transmission point corresponds to a cell. In a network complying with the specifications of 3GPP LTE Release 11, a cell may correspond to a plurality of transmission points.

A terminal is served by its server transmission point, i.e. it has communication set up with that transmission point.

The transmission points under consideration may be at the same location. Such a situation may arise for example when transmission points control different sectors from a common radio site. Under such circumstances, which are frequent, each transmission point creates a cell using antennas having an aperture of 120°.

The transmission points under consideration may be located on radio sites that are remote from one another while being under the control of a single processor unit, which may be referred to as the "base station".

When the interfering signal under consideration for the terminal T1 is of the MU-MIMO type, the second transmission point is the same as the first transmission point, since both terminals are being served by the same transmission point.

At least one of the terminals T1, T2 under consideration is of the non-linear receiver type with interference cancellation e.g. of the SIC type (which may be hard SIC or turbo SIC). This type of receiver can be configured, and in particular it is capable of performing reception processing with or without interference canceling.

The transmission points under consideration form a co-operation unit within which the network determines the parameters that can be configured with interference canceling being activated so as to improve the sum-rate.

The network retrieves indicators about the data rate that can be obtained by a terminal attached to a transmission point as a function of the processing performed by its receiver.

According to the general principle of the invention, these indicators correspond to CQIs calculated by the terminal on various different assumptions about the server transmission point and the receiver in use. There are three such indicators:

$CQI_i^{i,IaN}$ relates to the maximum data rate (or in equivalent manner the maximum MCS) that the terminal Ti (i=1 or 2) can receive from its server transmission point (the transmission point i) without interference canceling, e.g. by making use of an IRC or MMSE linear receiver;

$CQI_i^{i,SIC}$ relates to the maximum data rate (or in equivalent manner the maximum MCS) that the terminal Ti can receive from its server transmission point (the terminal point i) with interference canceling; and $CQI_i^{j,Agr}$ relates to the maximum data rate (or in equivalent manner the maximum MCS) that the terminal Ti can receive from its dominant interferer (specifically the transmission point j) using the receiver to estimate the interfering signal (e.g. an IRC receiver for hard SIC).

The terminal Ti making use of SIC processing imposes a constraint on the MCS used by the interfering transmission point. This constraint comes from the fact that the receiver Ti using the SIC processing must be capable of decoding the interference signal, which means that the MCS used by the interfering transmission point must be less than or equal to the MCS corresponding to $CQI_i^{j,Agr}$. In other words, for it to be possible for the terminal Ti to perform SIC processing in order to cancel the interference associated with the interfering transmission point, the MCS used simultaneously by the interfering transmission point for serving the terminal Tj must not exceed a threshold equal to the MCS corresponding to $CQI_i^{j,Agr}$.

Furthermore, the MCS of the terminal Tj must be less than or equal to the maximum MCS that it can receive from its server transmission point j. This maximum MCS that can be reached is indicated to the network by a CQI, e.g. $CQI_i^{i,IaN}$, if it is assumed that the terminal Tj does not have an SIC receiver.

The maximum MCS that the terminal Tj can receive in order to guarantee that the terminal Ti can perform cancellation of the signal for the terminal Ti is thus given by:

$$MCS_j = \min(MCS\lfloor CQI_i^{j,Agr}\rfloor, MCS\lfloor CQI_j^{j,IaN}\rfloor)$$

In this equation, the notation MCS[x] means "the MCS corresponding to CQIx". By way of example, this MCS may be the MCS that provides the same spectrum efficiency as that associated with the CQIx. In another implementation, it may be the MCS that provides the spectrum efficiency closest to a filtered version of the spectrum efficiencies associated with successive returns of the CQIx. By way of example, this filtering may comprise a mean of the CQIx spectrum efficiencies over a plurality of successive returns of the CQI (corresponding to different instants) in a given time window. In yet another implementation, the MCS may be the MCS that provides the spectrum efficiency associated with a corrected version of the CQIx. This corrected version may for example be the immediately higher CQI if the network has determined that the terminal always returns a pessimistic value for this CQI, or alternatively the immediately lower CQI if the network has determined that the terminal always returns an optimistic value of the CQI.

If the maximum MCS for the inferring terminal Tj served by the transmission point j ($MCS\lfloor CQI_j^{j,IaN}\rfloor$) is less than or equal to $MCS\lfloor CQI_i^{j,Agr}\rfloor$, then the network can allocate this maximum MCS to the terminal Tj. The terminal Ti can then successfully decode the signal transmitted for the terminal Tj and can perform interference canceling processing that is without impact on the performance of the terminal Tj.

In contrast, if the maximum MCS that can be achieved by an interfering terminal Tj served by the cell j ($MCS\lfloor CQI_j^{j,IaN}\rfloor$) is greater than $MCS\lfloor CQI_i^{j,Agr}\rfloor$, then the network needs to allocate an MCS to the terminal Tj that is lower than this maximum MCS in order to guarantee that the terminal Ti is capable of successfully decoding the signal transmitted for the terminal Tj so as to able to perform interference canceling processing. As a result, the network reduces the data rate of the terminal Tj in order to improve the data rate of the terminal Ti. However, applying such a method without taking precautions can lead to reducing the data rate of the terminal Tj in unacceptable manner in order to favor the terminal Ti, even if the sum-rate remains greater than the sum-rate that could be obtained without canceling interference. Furthermore, applying this method without taking precautions can lead to the sum-rate of the terminals Ti and Tj being reduced compared with the rate that would be obtained without canceling interference.

In order to ensure that the SIC processing performed by the terminal T1 provides the best improvement to the sum-rate, the invention comprises the following procedure.

Step 1: the network estimates the data rate that can be achieved for each possible receiver configuration of the terminals T1 and T2, written SR(Rx1,Rx2) where Rxi is the receiver of the terminal Ti, as follows:

$$SR(IaN,IaN) = R(MCS\lfloor CQI_1^{1,IaN}\rfloor) + R(MCS\lfloor CQI_2^{2,IaN}\rfloor)$$

$$SR(SIC,IaN) = R(MCS\lfloor CQI_1^{1,SIC}\rfloor) + R(\min(MCS\lfloor CQI_1^{2,Agr}\rfloor, MCS\lfloor CQI_2^{2,IaN}\rfloor))$$

$$SR(IaN,SIC) = RMCS\lfloor\min(CQI_2^{1,IaN})\rfloor) + R(MCS\lfloor CQI_2^{2,SIC}\rfloor)$$

In this equation, "R(x)" means the "data rate corresponding to MCSx", "IaN" means an IaN receiver (e.g. an MMSE receiver), and "SIC" means an SIC receiver.

In this implementation, no consideration is given to the situation in which both terminals make use simultaneously of an SIC receiver.

Step 2: the receiver configuration that is selected is the configuration that maximizes the sum-rate SR. This selection may be expressed mathematically as follows:

$$\{Rx1, Rx2\} = \mathrm{argmax} Sr(\ldots)$$

The MCSs selected for the terminals T1 and T2 are determined by the selected receivers, as follows:

$$\begin{cases} MCS_i = MCS[CQI_i^{i,IaN}] \\ MCS_j = MCS[CQI_j^{j,IaN}] \end{cases} \text{if}\{Rxi = IaN, Rxj = IaN\}$$

$$\begin{cases} MCS_i = MCS[CQI_i^{i,SIC}] \\ MCS_j = \min(MCS[CQI_i^{i,Agr}], MCS[CQI_j^{j,IaN}]) \end{cases} \text{if}\{Rxi = SIC, Rxj = IaN\}$$

Step 3: the network notifies the terminal that is to perform SIC processing and notifies the terminals of the respective data rates that have been allocated to them. The network also informs the terminal that is to perform SIC processing of the data rate that has been allocated to the interferer.

The sum-rate can be maximized by verifying that the data rate allocated to IaN terminal j is not reduced to the advantage of the SIC terminal i by more than a certain threshold. By way of example, such a threshold may be set at 10% of the data rate corresponding to $CQI_j^{j,IaN}$.

There follows a description of an implementation of a signaling method for making these notifications in the context of an LTE mobile cellular telecommunications network as defined by the 3GPP.

In such a network, the terminal returns to the network a CQI indicator of the maximum data rate (or in equivalent manner the maximum MCS) that the terminal can receive. On the basis of this data rate indicator returned by a terminal, the server transmission point does not change the power transmitted to the terminal, but instead adapts the MCS of the terminal in order to change the data rate.

The terminal evaluates the quality of a down link channel (CQI) by using reference signals that are transmitted by the base stations of the network. These reference signals are known to the terminal. In particular, in compliance with Version 11 of the LTE specifications, a terminal can estimate the power of each of the transmission points by making use of the channel state information—reference signal (CSI-RS) time-frequency resources associated with those points. In addition, interference measurement resource (IMR) time-frequency resources can be configured by the network in order to measure interference.

In the invention, the signaling method distinguishes between a plurality of data rate indicators.

An IaN first data rate indicator CQI, written $CQI_j^{j,IaN}$, where j is the number of the terminal, corresponds to the maximum data rate that the terminal Tj can receive (meaning that it can decode) from its server transmission point when performing reception processing without interference canceling. In order to determine this $CQI_j^{j,IaN}$, the terminal Tj can measure the power of the signal received over the CSI-RS resources corresponding to its server transmission point, and can measure the power of the interference received over an IMR resource configured by the network in order to represent current mean interference conditions; by way of example, this configuration may be such that the server transmission point does not transmit over this resource while it is used by the interfering transmission point for transmitting data to the terminals that they serve. The ratio of the signal power over the interference power can be used to deduce the data rate that can be received by the terminal that has not activated interference canceling, e.g. with deduction being performed by means of a correspondence table built up from measurements and stored in the terminal.

In a first particularly simple implementation, the signaling method takes account of two terminals T1 and T2. The terminal T1 is served by its server transmission point C1 and suffers interference from the signal transmitted by the interfering transmission point C2 that is serving the terminal T2; only one interferer is considered relative to the terminal T1. The terminal T1 can be configured to perform processing without interference canceling or with interference canceling. In abridged manner, this receiver is said to be an SIC receiver. The terminal T2 can make use only of a linear receiver. Under such circumstances, the terminal T1 returns an indicator $CQI_1^{1,IaN}$ and the terminal T2 returns an indicator $CQI_2^{2,IaN}$, with both of these indicators being calculated as described above.

Under such circumstances, the signaling method of the invention considers an SIC second data rate indicator CQI, written $CQI_1^{1,SIC}$ and an aggressor third data rate indicator CQI, written $CQI_1^{2,Agr}$.

The second data rate indicator $CQI_1^{1,SIC}$ corresponds to the maximum data rate that the terminal T1 can receive (meaning that it can decode) from its server transmission point when using reception processing with interference canceling. In order to determine this $CQI_1^{1,SIC}$, the terminal T1 may, for example, measure the power of the signal received over the CSI-RS resources corresponding to its server transmission point, measure the interference power received from the interfering transmission point C2 over the CSI-RS resources corresponding to the interfering transmission point, and measure the total interference power received over an IMR resource configured by the network to represent current mean interference conditions; by way of example, this configuration may be such that the server transmission point does not transmit over this resource while the resource is being used by the interfering transmission point for transmitting data to the terminals that they serve. By subtracting the interference power received from the transmission point C2 from the total interference power, the terminal can calculate the interference power corresponding to the situation in which the interference from the transmission point C2 is canceled perfectly. The ratio between the power of the signal and this calculated interference power can be used to deduce the data rate that can be received by the terminal for a receiver having interference canceling activated, e.g. with deduction being performed by using the correspondence table that is used for calculating IaN CQI.

The third data rate indicator $CQI_1^{2,Agr}$ corresponds to the maximum data rate that the terminal T1 can receive (meaning that it can decode) from the interfering transmission point C2 when performing reception processing without interference canceling. In order to determine this $CQI_1^{2,Agr}$, the terminal T1 may for example measure the power of the signal received over the CSI-RS resources corresponding to the interfering transmission point C2, and measure the interference power received over an IMR resource configured by the network to represent current mean interference conditions where the server transmission point C1 has created the interference, but not the interfering transmission point C2 since in this situation it is the server point; by way of example, this configuration may be such that the interfering transmission point C2 is not transmitting over this resource, while the resource is being used by the other transmission point (including C1) for transmitting data to the terminals they serve. The ratio of the signal power over the interference power can be used to deduce the data rate that can be received by the receiver that has not activated interference canceling, e.g. with deduction being performed by using the correspondence table for calculating IaN CQI.

Data rate indicators may be returned to the network in periodic or in aperiodic manner. Selecting between these two modes may depend on a radio resource occupation constraint.

Each terminal returns its CQIs to its transmission point. The two transmission points C1 and C2 are both controlled by the same base station.

In an implementation, these two transmission points may be in the same location. Such a situation arises, for example, with transmission points controlling different sectors from a common radio site. Under such circumstances, which are frequent, each transmission point may create a cell using antennas having an aperture of 120°.

In another implementation, these two transmission points C1 and C2 are located on mutually remote radio sites. Under such circumstances, they may be remote radio heads (RRHs) that are controlled by a common baseband unit (BBU).

The entity that controls the transmission points C1 and C2, and that therefore knows the various indicators that have been returned, serves to determine the maximum sum-rate SR. Since the returned indicators CQI correspond to data rate values, via MCS values, the maximum sum-rate may be determined by comparing the various calculated sum-rates:

$$SR(IaN,IaN)=R(MCS\lfloor CQI_1^{1,IaN}\rfloor)+R(MCS\lfloor CQI_2^{2,IaN}\rfloor)$$

$$SR(SIC,IaN)=R(MCS\lfloor CQI_1^{1,SIC}\rfloor)+R(\min(MCS\lfloor CQI_1^{2,Agr}\rfloor,MCS\lfloor CQI_2^{2,IaN}\rfloor))$$

in order to identify the maximum rate.

The way in which the data rate as a function of the MCS can be obtained is described in the document "3GPP TS 36.213 physical layer procedures": the data rate depends both on the MCS and on the number of PRB resources allocated to the terminal. In this implementation, it is assumed that the same PRB resources are allocated to both terminals, and that they represent the entire bandwidth of the system. The MCS corresponding to a particular CQI can be obtained by the MCS giving the same spectrum efficiency as that CQI. The spectrum efficiencies of various MCSs can be found in the document "R1-081638, Motorola, TBS and MCS signaling and tables, RAN1#52bis", while the spectrum efficiencies of CQIs can be found in the abovementioned document 3GPP TS 36.213.

If the maximum corresponds to SR(IaN,IaN), that means that using the capacity of the terminal T1 to cancel interference gives rise to no improvement in data rate at network level. The data rate to be transmitted by the server transmission point Cj for serving the terminal Tj is then given by $R(MCS\lfloor CQI_j^{j,IaN}\rfloor)$. Under such circumstances, the network notifies the terminal T1 that it should not activate SIC processing. This notification may be in the form of the position of a bit in a field in a PDCCH control channel.

If the maximum corresponds to SR(SIC,IaN), that means that using the capacity of the terminal T1 to cancel interference does give rise to an improvement in the data rate that can be obtained at network level. Under such circumstances, the network notifies the terminal that it should activate SIC processing. This notification may be in the form of the positioning of a bit in a field of a PDCCH control channel. The data rate to be transmitted by the server transmission point C1 for serving the terminal T1 is then given by $R(MCS\lfloor CQI_1^{1,SIC}\rfloor)$. SR(SIC,IaN) is the maximum of the sum-rates: SR(SIC,IaN)>SR(IaN,IaN). For the server transmission point C2, the data rate to be transmitted is given by the minimum of $MCS\lfloor CQI_1^{2,Agr}\rfloor$ and $MCS\lfloor CQI_2^{2,IaN}\rfloor$.

Specifically, as a function of the locations of the various terminals T1 and T2 relative to each other and relative to the two server transmission points, it can happen that the terminal T1 is capable of receiving the data rate given by $CQI_1^{2,Agr}$, but that the terminal T2 is not.

When the network notifies the terminal T1 to activate its capacity for canceling interference, it also sends it information to enable it to decode the interferer (the RNTI identifier of the terminal T2 together with its transmission parameters such as its MCS). This may be done using signaling techniques as described in the French patent applications FR 13/52453 and FR 13/52455 filed on Mar. 19, 2013 in the name of France Telecom.

In a second particularly simple implementation, the signaling method takes account of both terminals T1 and T2. The terminal T1 is served by its server transmission point C1 and suffers interference from the signal transmitted by the interfering transmission point C2 serving the terminal T2, and vice versa for the terminal T2; two interferers are thus taken into consideration, one relative to the terminal T1 and one relative to the terminal T2. Both of the terminals T1 and T2 can be configured to perform processing with or without interference canceling. In abridged manner, these receivers are said to be SIC receivers. The signaling method takes place in a manner similar to that described above for the first implementation, except that the terminal T2 returns as many data rate indicators as does the terminal T1. The network then calculates a third sum-rate SR(IaN,SIC) that is comparable to the second sum-rate:

$$SR(IaN,SIC)=R(MCS\lfloor \min(CQI_2^{1,Agr},CQI_1^{1,IaN})\rfloor)+R(MCS\lfloor CQI_2^{2,SIC}\rfloor)$$

and a maximum is determined from among the three sum-rates.

More generally, the method may be applied to a network having N transmission points at N SIC terminals. By way of example, consideration is given to an implementation where a terminal T1 served by a transmission point C1 suffers interference from signals transmitted by two interfering transmission points C2 and C3 that are serving respective terminals T2 and T3. It is also assumed that the interferer that is received with the greater power by the terminal T1 is the transmission point C2 serving the terminal T2. The terminal T1 has an activatable SIC receiver that is capable of canceling the signals from both interferers, or from only one of them, while the terminals T2 and T3 possess only IaN receivers.

The following circumstances are then possible for configuring the receivers:

1) The terminal T1 uses an IaN receiver without canceling interference.

2) The terminal T1 cancels the interference from the transmission point C2 but does not cancel the interference from the transmission point C3.

3) The terminal T1 cancels the interference from the transmission point C2 and then the interference from the transmission point C3.

4) The terminal T1 cancels the interference from the transmission point C3 but does not cancel the interference from the transmission point C2.

5) The terminal T1 cancels the interference from the transmission point C3, and then cancels the interference from the transmission point C2.

Each of the above situations leads to a particular data rate for the terminal T1 and imposes particular conditions on the data rates for the terminals T2 and T3, and it therefore requires particular CQIs to be returned. The order of decoding the interferers that maximizes the effectiveness of the process of estimating interference, and consequently that maximizes the data rate of the terminal T1, is to begin by canceling the interference that is received with the higher power. Consequently, in the following description of this implementation consideration is only given to situations 1 to 3, in order to limit the number of CQIs to be returned by the terminal T1.

The following CQIs need to be returned to the network by the terminal T1 as a function of the above situations, with the same notation as was used above being reused:

situation 1: $CQI_1^{1,IaN}$
situation 2: $CQI_1^{1,SIC(2)}$, $CQI_1^{2,Agr-IaN}$
situation 3: $CQI_1^{1,SIC(2,3)}$, $CQI_1^{2,Agr-IaN}$, $CQI_1^{3,Agr-SIC(2)}$ In the above expressions, the notation "Agr-IaN" means that the aggressor signal is estimated using an IaN receiver, while the notation "Agr-SIC" means that the aggressor signal is estimated using an SIC receiver. In addition, the notation "SIC(i,j)" means that the CQI is calculated by assuming that the SIC receiver cancels the interfering signals from the transmission points Ci and then Cj (where i and j may have the values 2 and 3 in this example).

In addition, each of the terminals T2 and T3 needs to return an IaN CQI, and these are written respectively $CQI_2^{2,IaN}$ and $CQI_3^{3,IaN}$.

In order to enable the network to select the receiver configuration that maximizes the sum-rate of T1, T2, and T3, the terminal T1 must thus return the following five CQIs: $CQI_1^{1,IaN}$, $CQI_1^{1,SIC(2)}$, $CQI_1^{2,Agr-IaN}$, $CQI_1^{1,SIC(2,3)}$, $CQI_1^{3,Agr-SIC(2)}$. The CQIs $CQI_1^{1,IaN}$, $CQI_1^{1,SIC(2)}$, $CQI_1^{2,Agr-IaN}$ are calculated by the terminal as explained for the situation in which there is only one interferer.

The CQI $CQI_1^{1,SIC(2,3)}$ corresponds to the maximum data rate that the terminal T1 can receive (meaning that it can decode) from its server transmission point when using reception processing with interference from the transmission points C2 and C3 being canceled. In order to determine this CQI, the terminal T1 may for example: measure the power of the signal received over the CSI-RS resources corresponding to its server transmission point; measure the interference power received from the interfering transmission point C2 over the CSI-RS resources corresponding to that interfering transmission point; measure the interference power received from the interfering transmission point C3 over the CSI-RS resources corresponding to that interfering transmission point; and measure the total interference power received over an IMR resource configured by the network to represent current mean interference conditions. By way of example, this configuration may be such that the server transmission point does not transmit over this resource so long as it is being used by other transmission points for transmitting data to the terminals that they serve. By subtracting the interference power received from the transmission point C2 and the power received from the transmission point C3 from the total interference power, the terminal can calculate the interference power corresponding to the situation in which the interference from the transmission points C2 and C3 is canceled perfectly. The ratio between the power of the signal to the last-calculated interference power can be used to deduce the data rate that can be received by the terminal for a receiver having interference canceling activated in order to cancel interference both from C2 and from C3, e.g. with deduction being performed by using the correspondence table used for calculating the IaN CQI.

The CQI $CQI_1^{3,Agr-SIC(2)}$ corresponds to the maximum data rate that the terminal T1 can receive (meaning that it can decode) from the interfering transmission point C3 with reception processing that makes use of canceling interference from the transmission point C2. In order to determine this CQI, the terminal T1 may for example measure the power of the signal received over the CSI-RS resources corresponding to the interfering transmission point C3. In order to measure the interference power, the terminal may measure firstly the power received over an IMR resource configured by the network to represent current mean interference conditions where the server transmission point C1 and the interfering transmission point C2 are creating interference, but not the interfering transmission point C3, since in this situation it is the server point; by way of example, this configuration may be such that the interfering transmission point C3 does not transmit over this resource while it is being used by the other transmission points (including C1 and C2) in order to transmit data to the terminals they serve. Furthermore, the terminal measures the interference power received from the interfering transmission point C2 using the CSI-RS resources corresponding to this transmission point. By subtracting the interference power received from the transmission point C2 from the interference power measured over the IMR resource, the terminal can calculate the interference power corresponding to the situation in which the interference from the transmission point C2 is canceled perfectly. The ratio of the signal power over this last-calculated interference power can be used to deduce the data rate that can be received by the terminal that has canceled interference from the transmission point C2 in order to detect the signal transmitted by the transmission point C3, e.g. with deduction being performed by using the correspondence table used for calculating IaN CQI.

In order to find the receiver configuration for the terminal T1 that maximizes the sum-rate, the network needs to evaluate the sum-rate corresponding to the situations 1 to 3, as follows:

$$SR(IaN, IaN, IaN) = \\ R(MCS[CQI_1^{1,IaN}]) + R(MCS[CQI_2^{2,IaN}]) + R(MCS[CQI_3^{3,IaN}])$$

$$SR(SIC(2), IaN, IaN) = R(MCS[CQI_1^{1,SIC(2)}]) + \\ R(\min(MCS[CQI_1^{2,Agr-IaN}], MCS[CQI_2^{2,IaN}])) + MCS[CQI_3^{3,IaN}]$$

$$SR(SIC(2, 3), IaN, IaN) = R(MCS[CQI_1^{1,SIC(2,3)}]) + \\ R(\min(MCS[CQI_1^{2,Agr-IaN}], MCS[CQI_2^{2,IaN}])) + \\ R(\min(MCS[CQI_1^{3,Agr-SIC(2)}], MCS[CQI_3^{3,IaN}]))$$

It should be observed that the above sum-rate expressions SR(IaN,IaN,IaN) and SR(SIC(2),IaN,IaN) can be deduced from the sum-rate SR(IaN,IaN) and SR(SIC,IaN) for a single interferer by adding thereto the data rate of the terminal T3 calculated for an IaN receiver.

In order to further reduce the number of CQIs that need to be returned, the network may decide to configure the terminal so as to return the CQIs corresponding only to situations 1 and 3, which amounts to four CQIs.

The receiver configuration of the terminal T1 (IaN,SIC (2), or SIC(2,3)) that maximizes the sum-rate is the configuration which leads to the greatest value for the above sum-rate.

The MCS to be allocated to each terminal is deduced from this configuration as for the situation in which there is only one interferer. For example, if the configuration SIC(2,3) is selected, then the MCSs for allocating to the terminals T1, T2, and T3 are given respectively by:

$MCS_1 = (MCS\lfloor CQI_1^{1,SIC(2,3)} \rfloor)$ $MCS_2 = \min(MCS\lfloor CQI_1^{2,Agr-IaN} \rfloor, MCS\lfloor CQI_2^{2,IaN} \rfloor)$ $MCS_3 = \min(MCS\lfloor CQI_1^{3,Agr-SIC(2)} \rfloor, MCS\lfloor CQI_3^{3,IaN} \rfloor)$ In a variant where each terminal has an SIC receiver capable of canceling two interferers, each terminal i returns all five CQIs, $CQI_i^{i,IaN}$, $CQI_i^{i,SIC(j)}$, $CQI_i^{j,Agr-IaN}$, $CQI_i^{i,SIC(j,k)}$, $CQI_i^{k,Agr-SIC(j)}$, where the most powerful interferer is the terminal j and the second most powerful interferer is the terminal k. The network must then compare the sum-rates corresponding to the various possible situations for receiver configurations. Assuming that both of the terminals T2 and T3 have the transmission point C1 as their main interferer, these situations are as follows:

SR(IaN, IaN, IaN)
SR(SIC(2), IaN, IaN)
SR(SIC(2,3), IaN, IaN)
SR(IaN, SIC(1), IaN)
SR(IaN, SIC(1,3), IaN)
SR(IaN, IaN, SIC(1))
SR(IaN, IaN, SIC(1,2))

Each of these sum-rates is calculated on the same principle as that explained above when only one terminal T1 is performing interference canceling.

The receiver configuration for the terminals T1, T2, and T3 that maximizes the sum-rate is the configuration that leads to the greatest value from among the above sum-rates. The corresponding MCSs are deduced from that configuration as when only one terminal T1 can cancel interference.

[1] Bruno Clerckx, Heunchul Lee, Young-Jun Hong, and Gil Kim, "Rank Recommendation-based Coordinated Scheduling for Interference Mitigation in Cellular Networks" in Proc. IEEE Global Telecom. Conference (GLOBECOM'11), December 2011.

Although the present disclosure has been described with reference to one or more examples, workers skilled in the art will recognize that changes may be made in form and detail without departing from the scope of the disclosure and/or the appended claims.

The invention claimed is:

1. A signaling method implemented by a cellular telecommunications network comprising a base station that controls at least a first transmission point serving a first terminal having a receiver with activatable interference canceling, the first terminal potentially suffering interference from an "interfering" signal for a second terminal, the signaling method comprising acts of:
   returning indicators from the first and second terminals to the network, the indicators comprising, for the respective terminal, an indicator of the maximum reception rate without interference canceling in the presence of the interfering signal, and further comprising, for the first terminal, both an indicator of the maximum reception rate with interference canceling in the presence of the interfering signal, and also an indicator of the maximum reception rate of the interfering signal;
   the network determining whether or not to activate interference canceling by the first terminal, and of determining the respective data rates to be allocated to the first and second terminals as a function of the returned indicators;
   the network notifying the first terminal whether or not to activate interference canceling and monitoring the first and second terminals of the respective allocated data rates; and
   the network signaling to the first terminal the data rate that has been allocated to the second terminal.

2. A signaling method according to claim 1, wherein the indicator of the maximum reception rate of the signal for the second terminal is determined without interference canceling on reception.

3. A signaling method according to claim 1, wherein the indicator of the maximum reception rate of the signal for the second terminal is determined with interference canceling on reception.

4. A signaling method according to claim 1, wherein the second terminal is served by a second transmission point different from the first transmission point, and wherein the return of indicators to the network comprise:
   returning indicators from the respective terminal to its server transmission point; and
   the indicators being transmitted from the transmission point to the base station.

5. A signaling method according to claim 1, wherein the second terminal also has a receiver with activatable interference canceling (SIC), and wherein:
   the act of returning indicators further comprises the second terminal returning an indicator of the maximum reception rate with interference canceling in the presence of the signal for the first terminal and an indicator of the maximum reception rate of the signal for the first terminal;
   the network determines whether to activate interference canceling by one or none of the terminals having a receiver with activatable interference cancellation;
   the network notifies the terminals with receivers having activatable interference canceling whether or not to activate interference cancellation; and
   the network also signals to the second terminal the data rate allocated to the first terminal.

6. A non-transitory computer-readable data medium storing a computer program comprising instructions for executing a signaling method when said program is executed by a computer, said method being implemented by a cellular telecommunications network comprising a base station that controls at least a first transmission point serving a first terminal having a receiver with activatable interference canceling, the first terminal potentially suffering interference from an "interfering" signal for a second terminal, the signaling method comprising acts of:
   receiving indicators from the first and second terminals to the network, the indicators comprising, for the respective terminal, an indicator of the maximum reception rate without interference canceling in the presence of the interfering signal, and further comprising, for the first terminal, both an indicator of the maximum reception rate with interference canceling in the presence of the interfering signal, and also an indicator of the maximum reception rate of the interfering signal;
   the network determining whether or not to activate interference canceling by the first terminal, and of determining the respective data rates to be allocated to the first and second terminals as a function of the returned indicators;
   the network notifying the first terminal whether or not to activate interference canceling and monitoring the first and second terminals of the respective allocated data rates; and
   the network signaling to the first terminal the data rate that has been allocated to the second terminal.

7. A base station of a cellular telecommunications network controlling at least a first transmission point that serves a first terminal with a receiver having activatable interference canceling, the first terminal potentially suffering interference from an "interfering" signal for a second terminal, the base station comprising:
  a computer; and
  a non-transitory computer-readable medium comprising instructions stored thereon, which when executed by the computer configure the computer to perform acts comprising:
  receiving indicators returned from the first terminal comprising an indicator of the maximum reception rate without interference canceling in the presence of the interfering signal, an indicator of the maximum reception rate with interference canceling in the presence of the interfering signal, and an indicator of the maximum reception rate of the interfering signal;
  notifying the first terminal whether or not to activate interference canceling and for notifying the data rate allocated as a function of the various indicators; and
  signaling to the first terminal the data rate allocated to the second terminal.

8. A terminal served by a first transmission point of a cellular telecommunications network, the transmission point being controlled by a base station, said terminal potentially suffering interference from an "interfering" signal for a second terminal, the terminal comprising:
  a computer; and
  a non-transitory computer-readable medium comprising instructions stored thereon, which when executed by the computer configure the computer to perform acts comprising:
  returning indicators to the network comprising an indicator of the maximum reception rate without interference canceling in the presence of the interfering signal, an indicator of the maximum reception rate with interference canceling in the presence of the interfering signal, and an indicator of the maximum reception rate of the interfering signal;
  reception processing with interference cancellation that is activatable by a parameter transmitted by the network;
  receiving the data rate allocated to that terminal as determined by the network as a function of the return indicators; and
  receiving signaling from the network about a data rate allocated to the second terminal.

9. A system for a cellular telecommunications network, the system comprising:
  a base station controlling at least a first transmission point of the cellular telecommunications network; and
  a first terminal with a receiver having activatable interference canceling served by the first transmission point and potentially suffering interference from an "interfering" signal for a second terminal;
  the base station comprising:
  a computer; and
  a non-transitory computer-readable medium comprising instructions stored thereon, which when executed by the computer configure the computer to perform acts comprising:
  receiving indicators returned from the first terminal comprising an indicator of the maximum reception rate without interference canceling in the presence of the interfering signal, an indicator of the maximum reception rate with interference canceling in the presence of the interfering signal, and an indicator of the maximum reception rate of the interfering signal;
  notifying the first terminal whether or not to activate interference canceling and for notifying the data rate allocated as a function of the various indicators; and
  signaling to the first terminal the data rate allocated to the second terminal;
  the terminal comprising:
  a computer; and
  a non-transitory computer-readable medium comprising instructions stored thereon, which when executed by the computer configure the computer to perform acts comprising:
  returning indicators to the network comprising an indicator for maximum data rate with reception without interference canceling in the presence of the interfering signal, an indicator of the maximum reception rate with interference canceling in the presence of the interfering signal, and an indicator of the maximum reception rate of the interfering signal;
  reception processing with interference cancellation that is activatable by a parameter transmitted by the network;
  receiving the data rate allocated to the terminal as determined by the network as a function of the return indicators; and
  receiving signaling from the network about a data rate allocated to the second terminal.

\* \* \* \* \*